(12) United States Patent
Jeong et al.

(10) Patent No.: US 8,234,893 B2
(45) Date of Patent: Aug. 7, 2012

(54) COLD-START IN SITUATION-AWARE SYSTEMS

(75) Inventors: Sangoh Jeong, Palo Alto, CA (US); Doreen Cheng, San Jose, CA (US); Swaroop Kalasapur, Santa Clara, CA (US); Yu Song, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 799 days.

(21) Appl. No.: 12/109,924

(22) Filed: Apr. 25, 2008

(65) Prior Publication Data

US 2009/0271148 A1 Oct. 29, 2009

(51) Int. Cl.
G06F 17/18 (2006.01)
G06F 19/00 (2006.01)
G06F 11/30 (2006.01)
G06N 5/02 (2006.01)

(52) U.S. Cl. ............. 70/181; 702/179; 702/182; 706/46
(58) Field of Classification Search .......... 702/179–182; 706/45–47; 707/600–831
See application file for complete search history.

(56) References Cited

U.S. PATENT DOCUMENTS

| | | | | |
|---|---|---|---|---|
| 6,687,696 | B2 * | 2/2004 | Hofmann et al. ................... 1/1 |
| 7,756,879 | B2 * | 7/2010 | Parsons et al. ................. 707/748 |
| 7,849,141 | B1 * | 12/2010 | Bellegarda et al. ........... 709/206 |
| 7,853,485 | B2 * | 12/2010 | Song et al. .................... 705/26.8 |
| 2006/0112047 | A1 * | 5/2006 | Zelinsky et al. ................ 706/46 |
| 2007/0094194 | A1 * | 4/2007 | Zelinsky et al. ................ 706/46 |

OTHER PUBLICATIONS

Queiroz et al., "Making Collaborative Group Recommendations Based on Modal Symbolic Data", 2004, Springer-Verlag Berlin Heidelberg, pp. 307-316.*

Q. Li and B. M. Kim. "Clustering Approach for Hybrid Recommender System", Proc. of the IEEE/WIC International Conference on Web Intelligence, 2003, 7 pages.

H. Kim, J. Kim, and J, Herlocker, "Feature-based Predication of Unknown Preferences for Nearest-Neighbor Collaborative Filtering", Proc. of the 4$^{th}$ IEEE International Conference on Data Mining, 2004, 11 pages.

A. I. Schein, A. Popescul, and L. H. Ungar, "Methods and Metrics for Cold-start Recommendations," in Proc. 25th Ann. Int. ACMSIGIR Conf. Res. Dev. Inf. Retrieval, 2002, pp. 253-260.

S. Dornbush, K. Fisher, K. McKay, A. Prikhodko, and Z. Segall, "XPod a Human Activity and Emotion Aware Mobile Music Player", Proceedings of the International Conference on Mobile Technology, Applications and Systems, Nov. 2005, 6 pages.

Lei et al., "Applying Situation Awareness to Mobile Proactive Information Delivery," Lecture Notes in Computer Science, 2007, vol. 4809/2007, pp. 592-603.

* cited by examiner

*Primary Examiner* — Michael Nghiem
*Assistant Examiner* — Ricky Ngon
(74) *Attorney, Agent, or Firm* — Beyer Law Group LLP

(57) ABSTRACT

A definition of a set of context variables to be considered is received, wherein the context variables represent categories of situations in which the computer system can be. A definition of a set of activities to be considered is also received, wherein the activities represent activities that can be performed using the computer system. For each context variable to be considered, a definition of a set of states to be considered is received, wherein the states represent situations in which the computer system can be. For each context variable to be considered, a specification of first probability distributions for each corresponding state is received. For each context variable to be considered, for each activity to be considered, a specification of second probability distributions to represent the likelihood of the activity being performed in the corresponding context is received. Usage data is generated using the first second probability distributions.

16 Claims, 10 Drawing Sheets

| Time | Loc. | Temp | Email | Web | Note |
|------|------|------|-------|-----|------|

COLD-START IN SITUATION-AWARE SYSTEMS

BACKGROUND OF THE INVENTION

1. Field of the Invention

The present invention relates to systems that take into account the situations of users. More particularly, the present invention relates to a cold-start in situation-aware systems.

2. Description of the Related Art

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and Multimedia Messaging Service (MMS) for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2 and Open Mobile Alliance (OMA).

There are many circumstances in which it would be beneficial for a computer or other electronic device to take into account the situations of users. One such example is where a system wishes to be able to recommend software applications or other items for a user to download, install, and/or utilize in other ways, for example, where the user is operating a mobile device. The display and interface limitations of such devices make it difficult for users to perform significant searching for applications using them. A user may be shopping and desire to utilize a price comparison software application on his mobile device. However, it would be difficult for the user to navigate the Internet and/or a directory of available software applications using the mobile device. In such cases, it would be beneficial to recommend to the user a small set of software applications.

SUMMARY OF THE INVENTION

In one embodiment, a method for obtaining situation-aware recommendations in a computer system is provided. A definition of a set of context variables to be considered is received, wherein the context variables represent categories of situations in which the computer system can be. A definition of a set of activities to be considered is also received, wherein the activities represent activities that can be performed using the computer system. For each context variable to be considered, a definition of a set of states to be considered is received, wherein the states represent situations in which the computer system can be. For each context variable to be considered, a specification of first probability distributions for each corresponding state is received. For each context variable to be considered, for each activity to be considered, a specification of second probability distributions to represent the likelihood of the activity being performed in the corresponding context is received. Usage data is generated using the first second probability distributions. A situation-aware recommendation process is then applied using the generated usage data.

In another embodiment of the present invention, another method for obtaining situation-aware recommendations in a computer system is provided. Initial training data is generated. A situation-aware recommendation process is run a first time using the initial training data. One or more items of initial training data is replaced with trace usage data from a device. Then the situation-aware recommendation process is run a second time using the trace usage data.

In another embodiment of the present invention, an apparatus is provided comprising: an interface; and one or more processors configured to: receive a definition of a set of context variables to be considered, wherein the context variables represent categories of situations in which the computer system can be; receive a definition of a set of activities to be considered, wherein the activities represent activities that can be performed using the computer system; for each context variable to be considered, receive a definition of a set of states to be considered, wherein the states represent situations in which the computer system can be; for each context variable to be considered, receive a specification of first probability distributions for each corresponding state; for each context variable to be considered, for each activity to be considered, receive a specification of second probability distributions to represent the likelihood of the activity being performed in the corresponding context; generate usage data using the first second probability distributions; and apply a situation-aware recommendation process using the generated usage data.

In another embodiment of the present invention, an apparatus is provided comprising: an interface; and one or more processors configured to: generate initial training data; run a situation-aware recommendation process a first time using the initial training data; replace one or more items of initial training data with trace usage data from a device; and run the situation-aware recommendation process a second time using the trace usage data.

In another embodiment of the present invention, a system for obtaining situation-aware recommendations in a computer system is provided, the system comprising: means for receiving a definition of a set of context variables to be considered, wherein the context variables represent categories of situations in which the computer system can be; means for receiving a definition of a set of activities to be considered, wherein the activities represent activities that can be performed using the computer system; means for, for each context variable to be considered, receiving a definition of a set of states to be considered, wherein the states represent situations in which the computer system can be; means for, for each context variable to be considered, receiving a specification of first probability distributions for each corresponding state; means for, for each context variable to be considered, for each activity to be considered, receiving a specification of second probability distributions to represent the likelihood of the activity being performed in the corresponding context; means for generating usage data using the first second probability distributions; and means for applying a situation-aware recommendation process using the generated usage data.

In another embodiment of the present invention, another system for obtaining situation-aware recommendations in a computer system is provide, the system comprising: means for generating initial training data; means for running a situation-aware recommendation process a first time using the initial training data; means for replacing one or more items of initial training data with trace usage data from a device; and means for running the situation-aware recommendation process a second time using the trace usage data.

In another embodiment of the present invention, a program storage device readable by a machine tangibly embodying a program of instructions executable by the machine to perform a method for obtaining situation-aware recommendations in a computer system is provided, the method comprising: receiving a definition of a set of context variables to be considered, wherein the context variables represent categories of situations in which the computer system can be; receiving a definition of a set of activities to be considered, wherein the activities represent activities that can be performed using the computer system; for each context variable to be considered, receiving a definition of a set of states to be considered, wherein the states represent situations in which the computer system can be; for each context variable to be considered, receiving a specification of first probability distributions for each corresponding state; for each context variable to be considered, for each activity to be considered, receiving a specification of second probability distributions to represent the likelihood of the activity being performed in the corresponding context; generating usage data using the first second probability distributions; and applying a situation-aware recommendation process using the generated usage data.

In another embodiment of the present invention, another program storage device readable by a machine tangibly embodying a program of instructions executable by the machine to perform a method for obtaining situation-aware recommendations in a computer system is provide, the method comprising: generating initial training data; running a situation-aware recommendation process a first time using the initial training data; replacing one or more items of initial training data with trace usage data from a device; and running the situation-aware recommendation process a second time using the trace usage data.

BRIEF DESCRIPTION OF THE DRAWINGS

FIG. 1 is a diagram illustrating an example vector storing context and usage information for a single data point.

DETAILED DESCRIPTION OF SPECIFIC EMBODIMENTS

Figure 2:
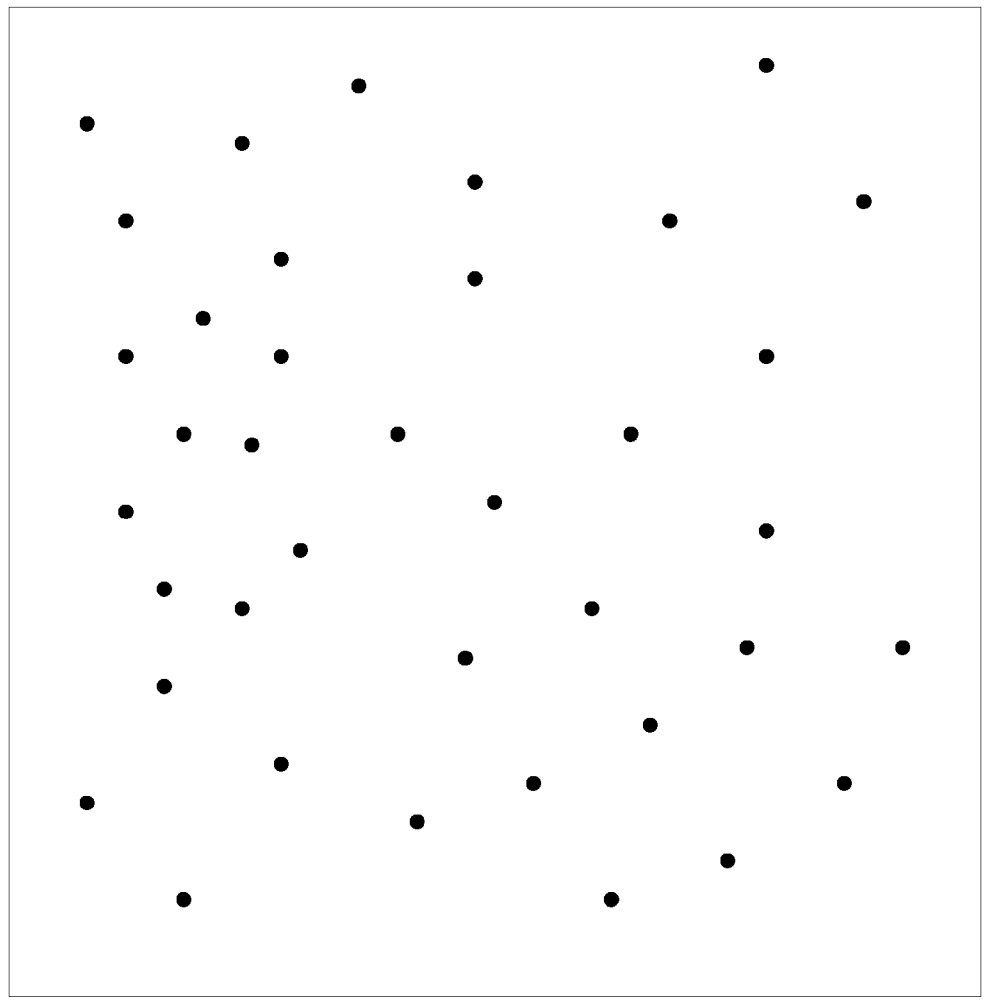
FIG. 2 is a diagram illustrating an example graph.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, software applications or other items may be automatically recommended to the user based on data related to the current context and past usage information. Context refers to the situation in which the user and/or device the user is operating. For example, the context may include the location of the user—whether the user is home, at the office, or elsewhere. The context may also include the time of day—for example, whether it is morning, afternoon, or evening. One of ordinary skill in the art will recognize that there may be many other types of information captured by the context and nothing in this document shall be read as limiting the invention to any particular type of information.

One way for a system to provide software recommendations would be to let a user specify his or her preferences, and use the preferences to guide application/service recommendations. For example, a user may indicate a preference for business-related software, and the system may use this information to err on the side of recommending business-related software applications. Thus, for example, if the choice is between a game application and a word processing application, the system would recommend a word processing application. This solution, however, suffers from the drawback that user studies have shown that few users would bother to specify preferences, as such there is simply no data from which to extract such a recommendation. Furthermore, even when preferences are specified, user preferences are usually situation-dependent, i.e., a user's preferences vary from situation to situation. For example, while a user may have a preference for business-related software while at work or during the daytime, the same user may have a preference for entertainment-related software while at home. In another example, at evening at home on a rainy day, the user may want to cook dinner and watch news, and may prefer software applications related to those tasks, while at a similar time at the office and in a meeting, the user may want to call home and arrange for food to be picked up on the way home. The preference-based approach to recommendations, used alone, simply does not provide the level of granularity needed to be effective for real-world uses.

Other approaches require the user to effectively train the device over a period of time ("supervised training"). However, supervised training may not be an ideal or a desired solution for many applications as it requires the use to spend a significant amount of time and effort to actively train the device. Another drawback is that conventional approaches are not flexible and do not readily adapt to changes in preferences, environment, or habits associated with the use of the device. Therefore, improved techniques for enhancing mobile devices and/or their use are needed.

As such, in an embodiment of the present invention, context information is captured and utilized in the application-recommending process. Data relating to previous usage information may be collected and stored as data points. The data point information may be stored in vectors. In an embodiment of the present invention, both the context and the usage information are stored in the vector. FIG. 1 is a diagram illustrating an example vector storing context and usage information for a single data point. In this example, context information includes time 100, location 102, and temperature 104. Usage information indicates which applications the user operated, including email 106, web browsing 108, and notepad 110.

Each data point may also be visualized as a point on a two-dimensional graph. FIG. 2 is a diagram illustrating an example graph. The proximity of data points to one another on the graph indicates the level of similarity of their vectors. In an embodiment of the present invention, these data points may be grouped into clusters of similar data points. Clustering is the classification of objects into different groups, or more precisely, the partitioning of a data set into subsets (clusters), so that the data in each subset (ideally) share some common trait—often proximity according to some defined distance measure. These clusters may then be utilized in aiding the system select appropriate applications to recommend.

Figure 3:
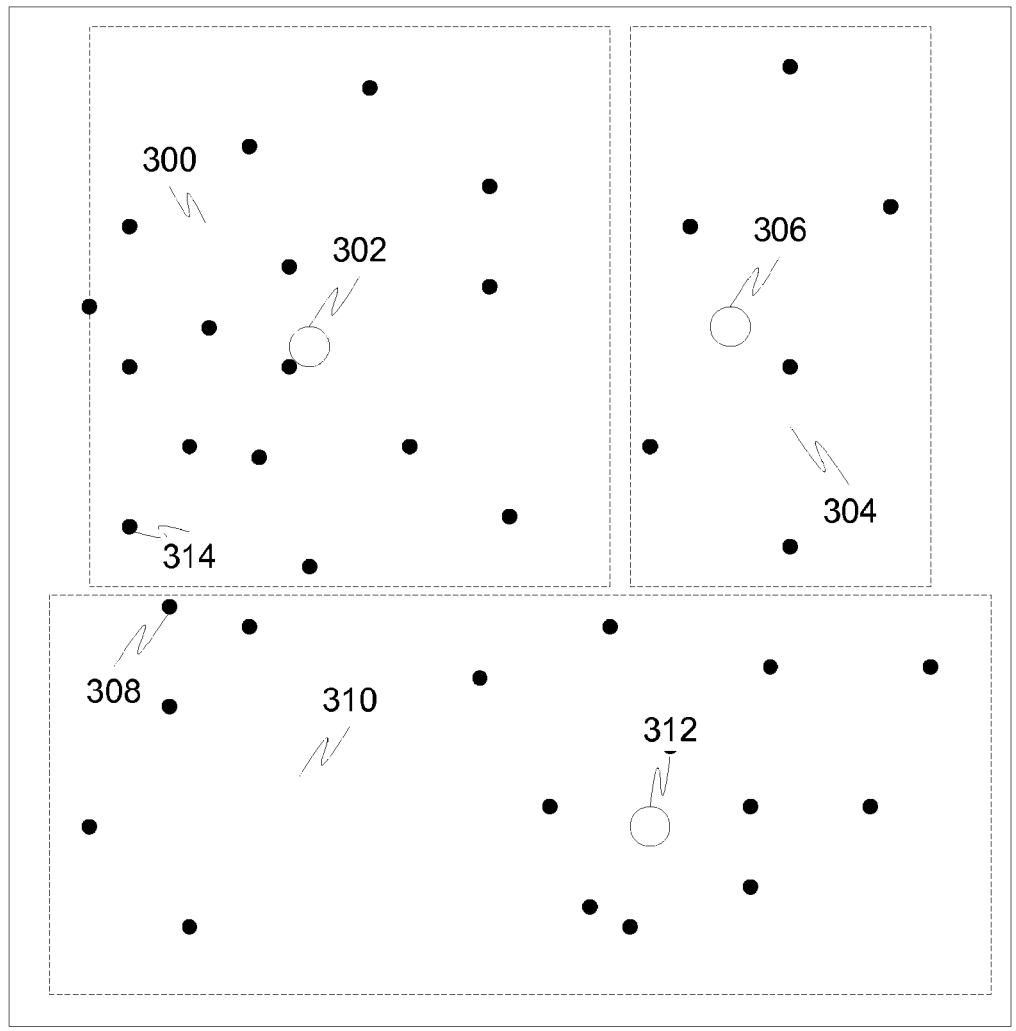
FIG. 3 is an example of the graph with the data points clustered.

One way to cluster the data points is to attempt to determine the optimum number of clusters for a given set of data points. This optimum number is known as K. There are a number of traditional techniques for making this determination, all of which are beyond the scope of this application. There are numerous drawbacks to this approach, however. K must be determined dynamically, and as such requires significant processing power, processing power that may be lacking in mobile devices. Additionally, K can be very difficult to determine with any degree of accuracy, and an incorrect guess can negatively impact both the clustering and recommendation accuracy. Given the partitioned clusters, one way to extract patterns is to compare the current data point with each of the cluster centroids and determine to which cluster the current data point belongs. The application patterns are then extracted from this cluster. For n-dimensional structures, a centroid is an intersection of all hyperplanes that divide X into two parts of equal moment about the hyperplane. Informally, it is the "average" or "mean" of all points of X. Thus, a centroid of a cluster is the mean of all points in the cluster. FIG. 3 is an example of the graph with the data points clustered. Cluster 300 has centroid 302 and Cluster 304 has centroid 306.

Comparing the centroids, however, may create a situation where certain neighboring data points may not be selected as one of the k neighboring data point, despite being close to the current data point, simply because they are part of clusters whose centroid is farther from the current data point than other centroids. One instance of such a case is depicted in FIG. 3, where data point 308 is part of cluster 310. Data point 308 is closer to cluster 300 than any of the data points in cluster 304, yet because the centroid 312 of cluster 310 is farther from the centroid 302 of cluster 300 than the centroid 306 of cluster 304, data point 308, despite being arguably the most similar to a relevant data point 314 in cluster 300, may not be used in the analysis.

In contrast to clustering, another way to extract patterns is to group neighboring data points nearest to the current data point. The nearest neighbors are those that are most similar to the current contexts and application usages. The application patterns are then extracted from these neighboring instances. This approach, however, requires that all of the existing data points be compared in order to find the neighbors, and thus is also not suitable for online computation on resource-limited devices such as mobile In an embodiment of the present invention, rather than estimating an "optimal" number of clusters before starting the clustering process, the number of clusters is dynamically chosen. Additionally, the number is chosen so as to result in compact (i.e., small) clusters. A threshold may be selected for the maximum number of points in a cluster and the clusters may be divided so that no cluster exceeds this threshold. In an alternative embodiment, rather than an upper threshold, a number representing the average number of points in a cluster may be selected and the data points clustered so that each cluster has at or near that number of data points. For example, if 5 is the average number of data points in each resulting cluster, and there are 3000 total data points in the usage data, then the data may be clustered into 600 clusters. Then, for each cluster, a centroid is computed and stored along with its containing data point. The compactness of a cluster may be measured by the average Euclidean distance from the data points in a cluster to the cluster's centroid. The smaller the average, the more compact a cluster is. The advantage of this approach is that, because the clusters are compact, the centroids better represents the data points in the corresponding clusters. This approach also does not require the resource-intensive task of deriving an optimal number for K.

When a new point comes in (i.e., a recommendation is to be made based on a current context), then this data point may be compared to the k closest neighboring centroids, rather than all of the data points. This greatly reduces the processing required to make the recommendation as it is no longer necessary to compare each individual data point to the new data point in order to derive accurate recommendations.

Figure 4:
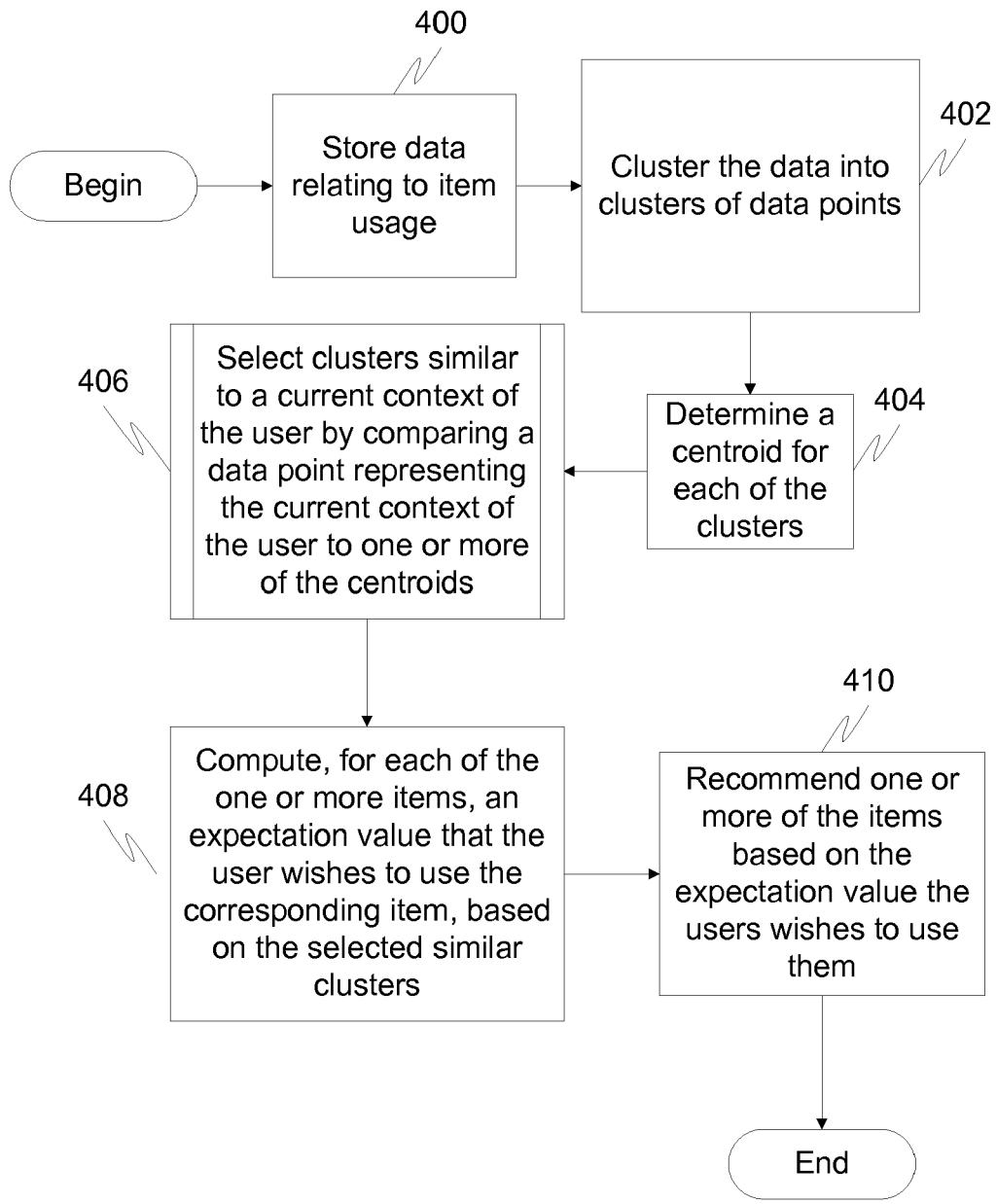
FIG. 4 is a flow diagram illustrating a method for making recommendations to a user in accordance with an embodiment of the present invention.

FIG. 4 is a flow diagram illustrating a method for making recommendations to a user in accordance with an embodiment of the present invention. Each step in this method may be embodied in hardware, software, or any combination thereof. The user may be utilizing an electronic device. This device may be a stationary device, such as a desktop computer, or may be a mobile device, such as a mobile phone, PDA, or laptop computer. One of ordinary skill in the art will recognize that other types of devices may be used with the present invention, and that nothing in this document shall be interpreted as limiting the device to any particular implementation.

In an embodiment of the present invention, since both the context part and usage part of a vector are used as input to a clustering algorithm. The result of this is a set of clusters wherein the centroid of each cluster contains a context part and a usage part. The context part of the centroid may be utilized for situation recognition. Specifically, the context part may be used to compare with the user's current context to identify clusters similar to the user's current context. The usage part may be used to compare with the items the user is currently utilizing (e.g., currently running applications) to identify clusters similar to the user's current usage.

In other words, the context part may be utilized to make recommendations based on the user's current context while the usage part may be utilized to make recommendations based on the user's current usage of items. In one embodiment, both are used together.

At step 400, data relating to item usages of the user is stored. This data includes information as to items which were used by the user and the context in which they were used. The items may include any items that the user may find getting recommendations on as helpful. In one embodiment of the present invention, the items may include software applications running on the device. Thus, the user may find it helpful to receive recommendations on other, perhaps non-running, applications so that the user does not download, install, or run applications that have only a low probability that the user may be interested in them. In another embodiment of the present invention, the items may include computing services. This may include, for example, applications that run on other devices, such as remote games, diagnostic services, or anti-virus services. In another embodiment of the present invention, the items may include other information, such as, for example, movies, web sites, music, etc. One of ordinary skill in the art will recognize that many different types of objects may be recommended using various embodiments of the present invention. This usage data may be stored in, for example, vectors. The vectors may contain contexts concatenated with application usage values.

At step 402, the data is clustered into clusters of input data points. The actual clustering may be accomplished using a variety of clustering techniques. In one embodiment, k-means clustering may be utilized. In k-means clustering, a system assigns each point to the cluster whose centroid is nearest. Thus, this procedure becomes:

(1) Randomly generate k clusters and determine the cluster centers, or directly generate k random points as cluster centers.

(2) Assign each point to the nearest cluster center.

(3) Recompute the new cluster centers.

(4) Repeat the two previous steps until some convergence criterion is met (usually that the assignment hasn't changed).

The main advantages of using k-means clustering are its simplicity and speed which allows it to run on large datasets. Its disadvantage is that it does not yield the same result with each run, since the resulting clusters depend on the initial assignments Another possible clustering technique is the use of co-clustering. Given a multi-dimensional data matrix, co-clustering refers to simultaneous clustering along multiple dimensions. Thus, for example, not only the objects are clustered but also the features of the objects, i.e., if the data is represented in a data matrix, the rows and columns are clustered simultaneously. In a two-dimensional case it is simultaneous clustering of rows and columns, in contrast to clustering along a single dimension. Co-clustering has the advantage of handling sparse data points better.

Yet another possible clustering technique is vector quantization. Vector quantization is a technique borrowed from signal processing that allows the modeling of probability density functions by the distribution of prototype vectors. It works by dividing a large set of points (vectors) into groups having approximately the same number of points closest to them. Each group is represented by its centroid point, as in k-means and some other clustering algorithms.

One of ordinary skill in the art will recognize that there are other clustering techniques that can be used in the present invention. Nothing in this document shall be construed as requiring the use of any particular clustering technique.

At step 404, a centroid is determined for each of the clusters.

At step 406, clusters similar to a current context of the user are selected by comparing a data point representing the current context of the user to one or more of the centroids. In one embodiment of the present invention, the data point is compared to the centroids of each of the clusters. This comparison may include a series of steps. These steps are described in FIG. 5.

Figure 5:
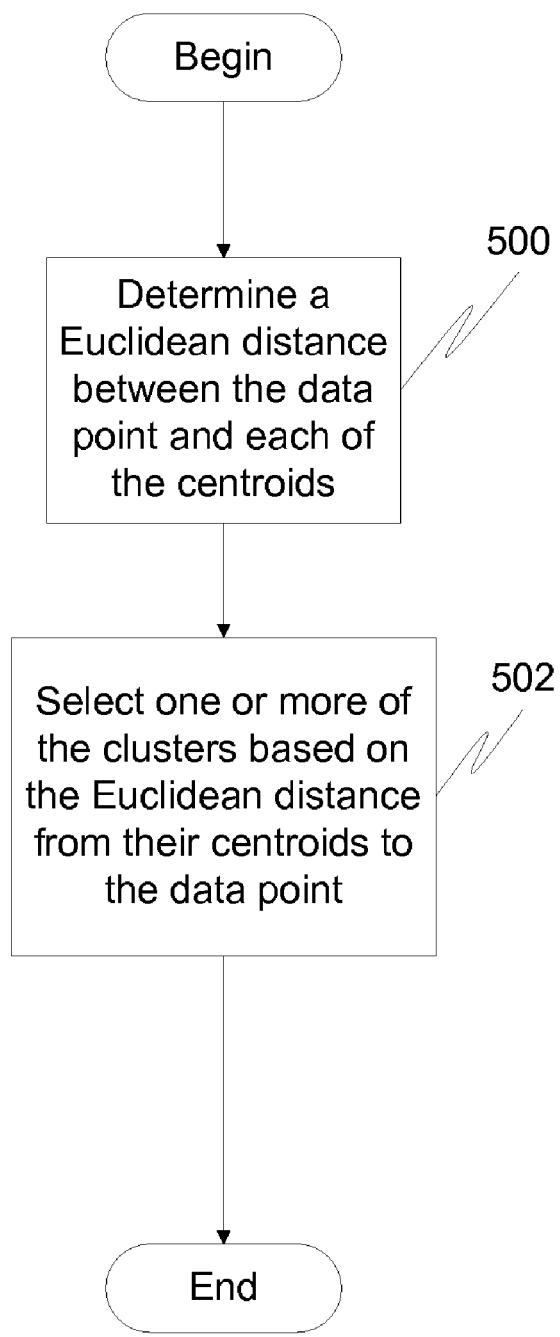
FIG. 5 is a flow diagram illustrating a method for selecting clusters similar to a current context of a user by comparing a data point representing the current context of the user to one or more of the centroids in accordance with an embodiment of the present invention.

FIG. 5 is a flow diagram illustrating a method for selecting clusters similar to a current context of a user by comparing a data point representing the current context of the user to one or more of the centroids in accordance with an embodiment of the present invention. Each step of this method may be embodied in software, hardware, or any combination thereof. At 500, a Euclidean distance between the data point and each of the centroids may be determined. Various techniques exist for quickly and efficiently computing the Euclidean distance between data points. Such techniques are outside the scope of this disclosure, but one of ordinary skill in the art will recognize that any such technique may be utilized.

At 502, one or more of the clusters may be selected based on the Euclidean distance from their centroids to the data point. The closest centroids to the data point represent the most similar clusters to the data point.

Referring back to FIG. 4, once the one or more similar clusters have been selected, at 408 the system computes, for each of one or more items, an expectation value that the user wishes to use the corresponding item, based on the selected similar clusters. The expectation value reflects the chances that the user will wish to use the corresponding item. One of ordinary skill in the art will recognize that this may be accomplished in many different ways. One way is to compute a centroid vector of the data points in the selected clusters. The centroid vector then represents the expectation value of usage pattern for each item.

At step 410, one or more of the items may be recommended based on the expectation value that the user wishes to use them. The number of items to recommend may be determined in a number of different ways. It should be noted that this embodiment may be applied to recommendation of items even without utilizing the previously described embodiments relating to the clustering of the data and selection of similar clusters. In other words, the thresholding technique may be applied to many different recommendation systems, and should not be interpreted as being limited to the exact recommendation systems described in this document unless expressly stated.

In one embodiment, the system recommends x items having the highest probability that the user wishes to use them, wherein x is dynamically determined by using the average number of items that have been used in the selected clusters. In another embodiment of the present invention, x is simply a preset value selected by an administrator.

An issue arises when using the above algorithm or other situation-aware algorithms: when the system is first used, there is no context information or other usage data from which to base the initial recommendations. Training data is needed to set the parameters of the learning algorithms. After the parameters are set, the systems can recognize a situation from the current context and can provide recommendations related to the recognized situation. Until sufficient training data are collected from the usage log, however, there is no way for these systems to provide recommendations for the users. This problem may be called a "cold-start" problem.

In one embodiment of the present invention, the cold-start problem is solved by generating usage data through user models that are a close as possible to real life users, and personalizing the data for individual users. First, a set of situations typical to the population, and the activities typically performed in the set of situations, can be identified. Usage data may then be generated for every situation. The generated usage data is then used for the training data as an alternative to real-life usage data at the cold-start time.

Generating usage data for the defined set of situations can involve specifying a set of context variables to be considered, specifying a set of activities to be considered, and specifying the number of data points to be generated. For each of the situations in the situation set, a number of steps may be performed (in any order). For each of the context variables, a statistical numerical distribution may be specified for the variable so that the distributions for all context variables can be used to define the situation. For each of the activities in the situation, a statistical numerical distribution that indicates the likelihood of the people to perform the activity in the situation. These specifications may then be used to generate the actual usage data.

The generated usage data can then be used by the device at cold-start time to make reasonable recommendations. For the learning algorithms to adapt the algorithm parameters to a particular person, the data may be smoothly personalized while keeping the advantage of being able to make serendipitous recommendations. This is accomplished by replacing the generated data item with a real like usage data item only when the data items are similar.

The above-described solution enables reasonable recommendations to be made, even in the absence of usage data. Additionally, since the initial training data is generated from a probabilistic description for desired situations, the generated data having category information can be used in both supervised and unsupervised learning approaches. It also provides possibilities for serendipitous recommendations, and can be used to provide downloadable distributions for users who want to get cold-start recommendations based on different personal needs.

Figure 6:
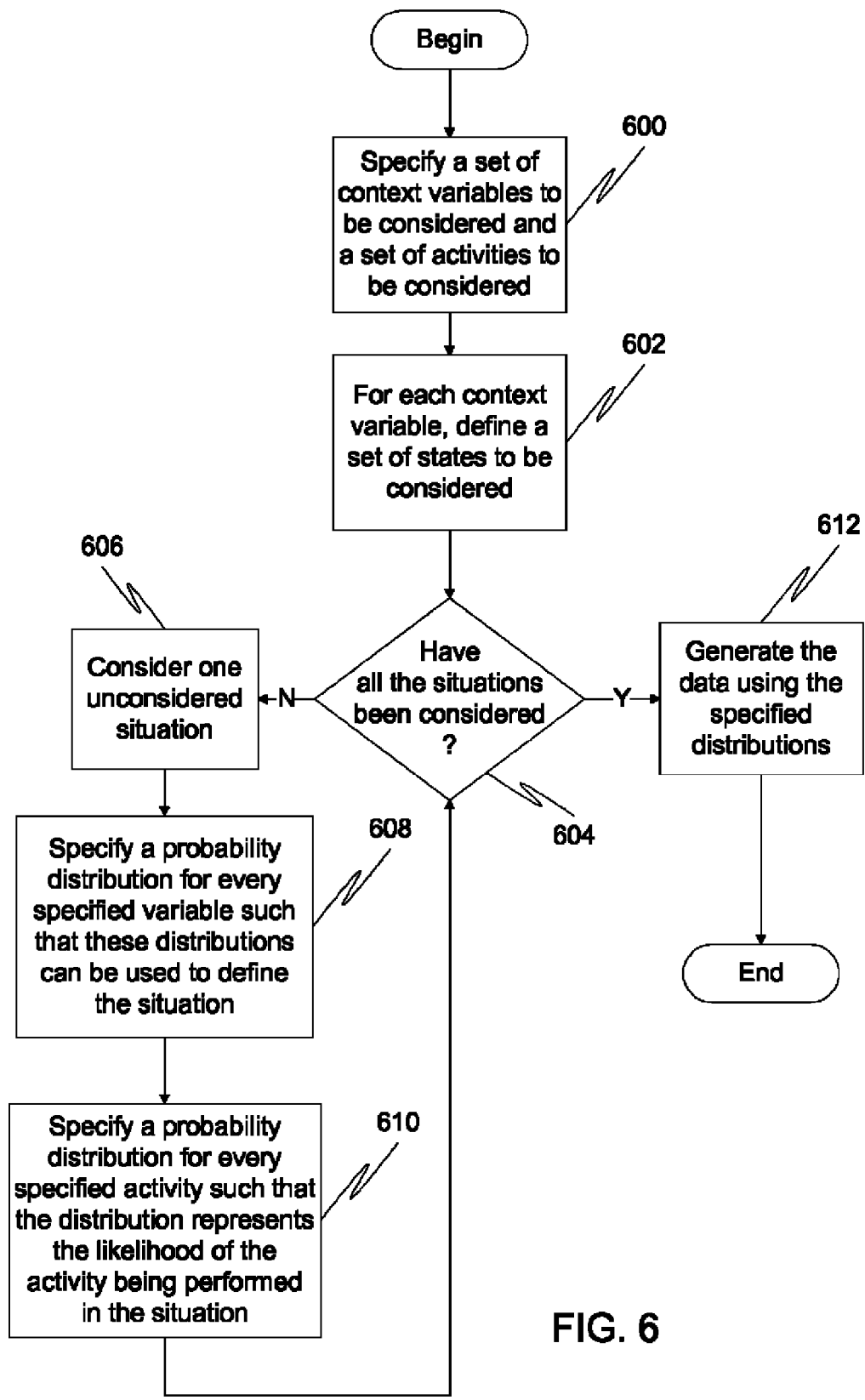
FIG. 6 is a flow diagram illustrating a method for generating usage data using realistic user models in accordance with an embodiment of the present invention.
Figure 7:
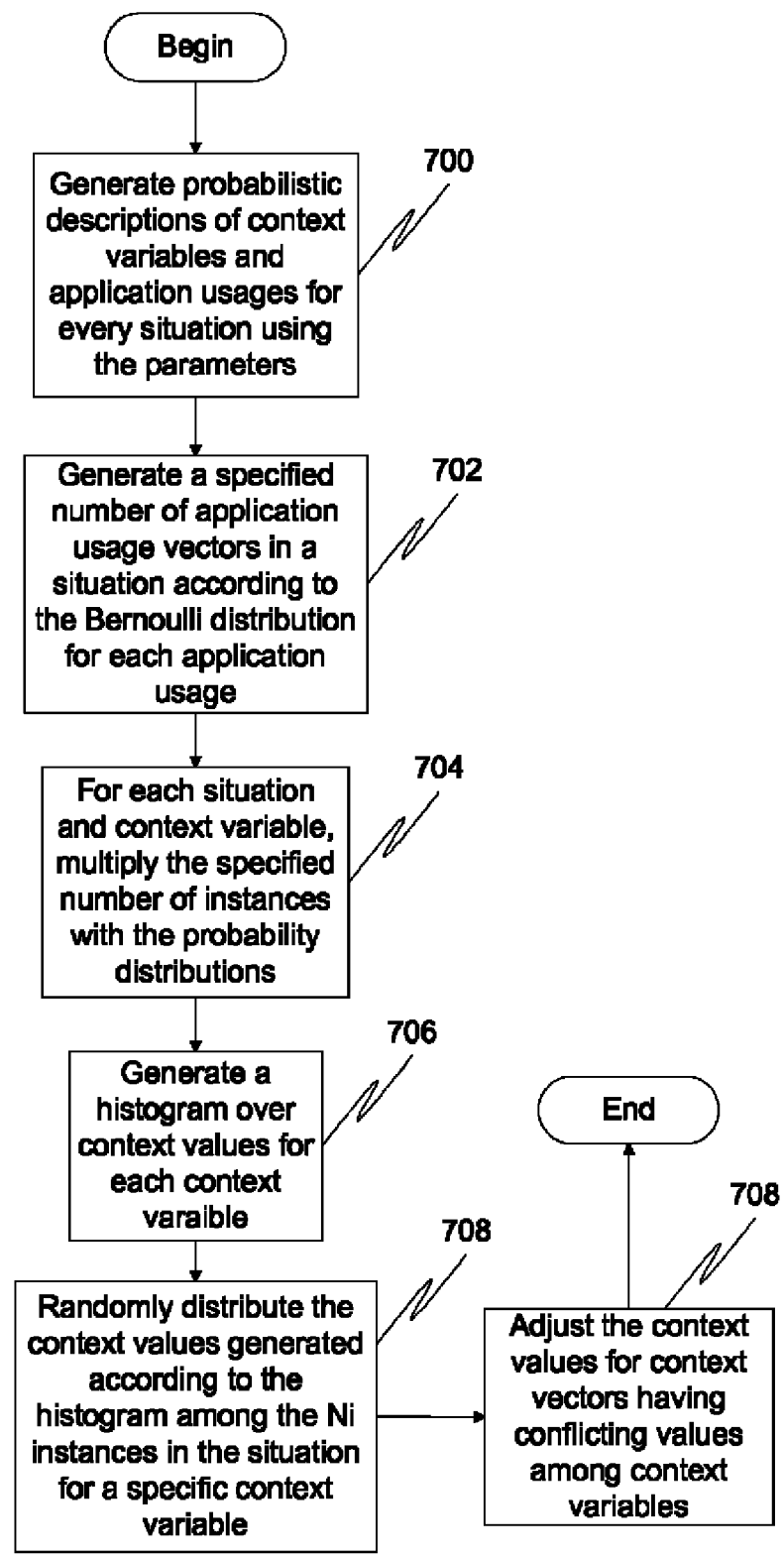
FIG. 7 is a flow diagram illustrating a more detailed example embodiment of generating initial training data in accordance with an embodiment of the present invention.

FIG. 6 is a flow diagram illustrating a method for generating usage data using realistic user models in accordance with an embodiment of the present invention. Each step of this method may be embodied in hardware, software, or any combination thereof. For steps that are performed by a user, the hardware and/or software may receive the information supplied by the user. At 600, a set of context variables to be considered and a set of activities to be considered are specified. At 602, for each context variable, a set of states to be considered is defined. FIG. 7 is a diagram illustrating examples of context variables to be considered, their respective states, and examples of how each variable can be obtained. In addition to these context variables, a number of applications to be considered are defined. While not pictured in FIG. 7, these applications may include, for example, a news reader, service guide, communicator, music player, calendar, media player, game, map, and photo taking.

At 604, it may be determined if all the situations in the set have been considered. The first time through the loop, of course, the answer will be no, since the set is non-empty. Thus, when the answer is no, at 606 one unconsidered situation in the set is considered. At 608, a probability distribution for the situation is specified for every specified variable. This distribution may be, for example, a mathematical distribution. This distribution can be used to define the situation. This is so that the distributions form a good model of the chosen user population. Meanwhile, at 610, for each activity in consideration, a probability distribution may be defined to represent the likelihood of the activity being performed in situation under consideration. It should be noted that while 608 and 610 are depicted in order in FIG. 6, these steps may be performed in any order, or even simultaneously.

After the distributions for all the situations in consideration are specified, then at 612, usage data is then generated using the distributions. Alternatively, the usage data for a situation can be generated after the context distributions and activity distributions are specified for the situation.

The specification process may be executed by system designers, application designers, etc. Alternatively, a template can be distributed to selected users in the target population and the distributions can be collected from the selected users. The final distributions may then be constructed from the user-defined distributions.

FIG. 7 is a flow diagram illustrating a more detailed example embodiment of generating initial training data in accordance with an embodiment of the present invention. Each step of the method may be performed in hardware, software, or any combination thereof. As an example, assume that the activities being considered are application usages and binary values are used for application usages for each situation (1 for use, 0 for non-use). At 700, probabilistic descriptions of context variables and application usages for every situation can be generated using these parameters. Then, at 702, a specified number of application usage vectors in a situation ($N_i$, where i is a situation index) can be generated according to the Bernoulli distribution for each application usage. This can be done by multiplying $N_i$ with each probability of application j's usage ($P_{ij}$), then generating 1's equal to a rounded integer number of ($N_i \times P_{ij}$) and 0's equal to $N_i$ minus the rounded integer. These 1's and 0's are randomly distributed among the $N_i$ instances in the situation for a specific application usage. It should be noted that the Bernoulli distribution only applies when the application has two states. For embodiments where there are more than two states, the same procedure of generating context data can be applied to application data.

For each situation and context variable, at 704, the specified number of instances is multiplied with the probability distributions. The, for context variables, a similar data generation process may be applied except that a distribution over several values for each context variable may be used. For example, at 706, a histogram can be generated over context values for each context variable by multiplying $N_i$ with the probability distribution so that the cardinality of the histogram becomes the specified number of instances. Then, at 708, the context values generated according to the histogram are randomly distributed among the $N_i$ instances in the situation for a specific context variable.

Since this approach does not consider joint characteristics among the context variables (i.e., the values of the context variables are generated independently), some context values of the context vectors may have conflicting values among context variables. For example, at locations like home and office, it is not likely that the speed of the user's device is over 30 miles per hour. One would only expect that when the location involves travel. Therefore, in an embodiment of the present invention, at 710, these unrealistic values may be eliminated so that more realistic data from independent probability distributions can be generated.

Figure 8:
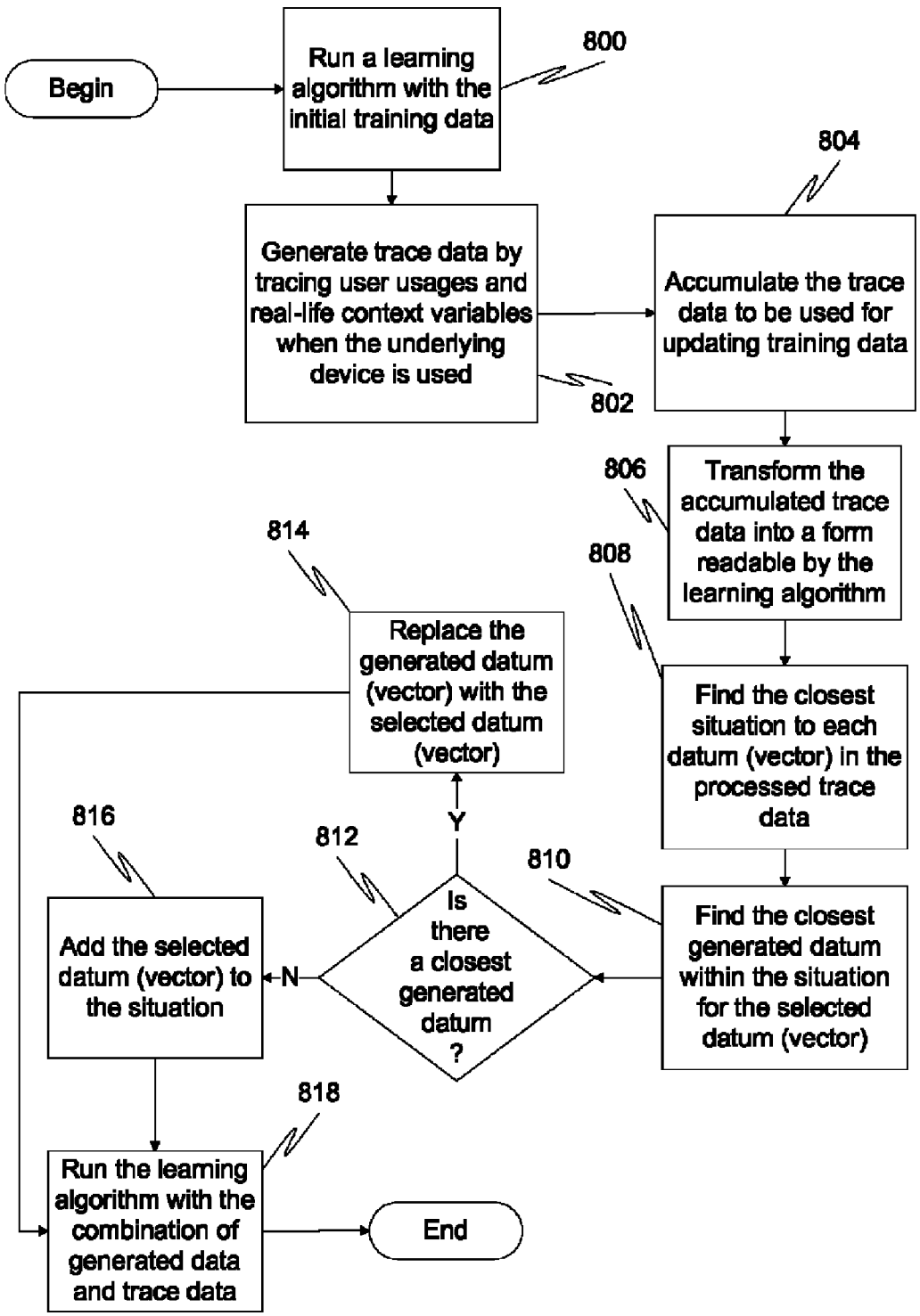
FIG. 8 is a flow diagram illustrating a method for updating the usage log and learned parameters.

The generated usage data may then be used as input to a learning algorithm for situation-aware recommendations at cold-start. In an embodiment of the present invention, in order to provide even better recommendations, the usage data and the learned parameters may be updated regularly over time. FIG. 8 is a flow diagram illustrating a method for updating the usage log and learned parameters. This may also be known as personalization. Each step of the method may be performed in hardware, software, or any combination thereof. The input to the flow diagram is the generated initial training data, such as the data generated via FIG. 6. It should be noted, however, that the method depicted in FIG. 8 may be used with initial training data generated by any number of mechanisms, and should not be interpreted as being limited to combination with FIG. 6.

At 800, a learning algorithm is run with the initial training data. It should be noted that because the initial training data is generated rather than gathered, it is assumed that it will already be in a form that is readable by the learning algorithm. However, if that is not the case, then the usage data may be transformed into a form readable by the learning algorithm prior to step 800 being executed.

At 802, when the underlying device is used, trace data is generated by tracing user usages and real-life context variables. At 804, the trace data is accumulated to be used for updating training data. At 806, the accumulated trace data may be transformed into a form readable by the learning algorithm. There are then various ways to update the usage data. The simplest is to replace the entire generated data by the real-life traced data when a sufficient amount of trace data becomes available. The advantage of this approach is its simplicity, but the disadvantage is that the personalization will take a longer period of time, as the data used by the learning algorithm will not in any way reflect real-world data until enough of it has been gathered to make the switchover. Alternatively, the trace data may be used to replace only a portion of the generated data at a time. This latter embodiment is the one pictured in FIG. 8. At 808, the system finds the closest situation to each datum (vector) in the processed trace data. At 810, for the selected datum (vector), the system may then find the closest generated datum within the situation. At 812, it is determined if there is such a vector. If there is, then at 814, the vector may be replaced with the selected datum (vector). If there is not, then at 816, the selected datum (vector) may simply be added to the situation. This could be in a situation where there is no generated data (all true training data). At 818, the learning algorithm is run with the combination of generated data and trace data.

Figure 9:
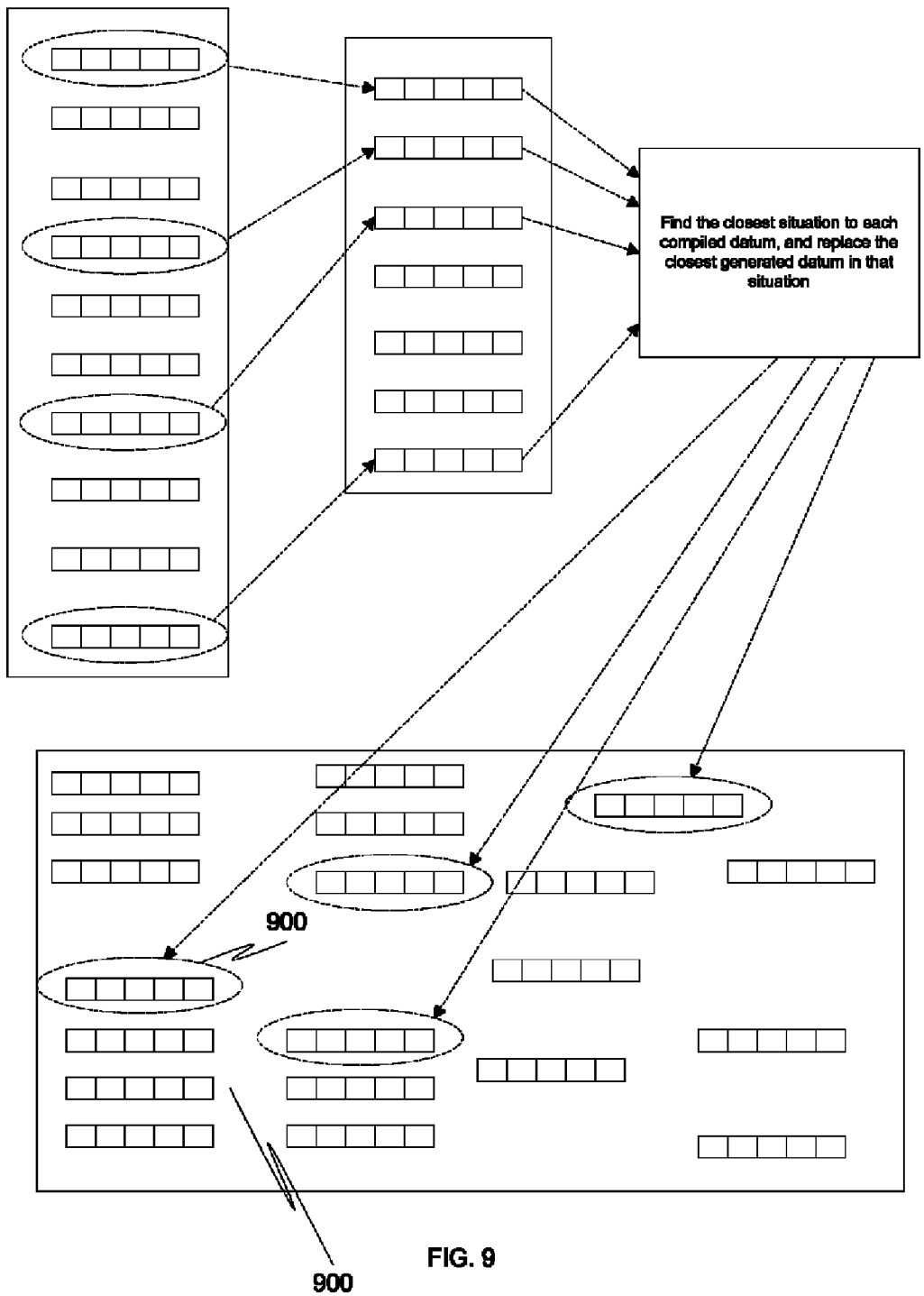
FIG. 9 is a diagram illustrating an example replacement process of initial training data with trace data in accordance with an embodiment of the present invention.

FIG. 9 is a diagram illustrating an example replacement process of initial training data with trace data in accordance with an embodiment of the present invention. As can be seen, initially generated data 900 may be partially replaced with trace data 902.

In another embodiment of the present invention, the probability-based solution described above may be combined with other techniques to improve the recommendation process. For example, a solution based on user-selected preferences was previously described in this document. While such a solution is very limited when utilized alone, if such a preference-based solution were combined with the probability-based solution described above, it may act to improve upon either solution operated alone. Such a solution might involve, for example, weighting the probabilities determined for a given context based upon the user preferences. For example, in a previously presented example, the probability that the user might wish to run a word processing application while at work and in the morning was listed at 0.89. However, perhaps this particular user prefers to play game applications while at work in the morning, because the user's boss does not come into work until the afternoon. If the user indicated that fact by providing a preference for game applications, the probability that the user might wish to run a word processing application may be reduced (or the probability that the user might wish to run a game application may be increased) by a weighting. In another embodiment of the present invention, the preferences may even be granularized to the same level as the tracked contexts, such that the user could expressly indicate a fondness for game applications while at work and during the mornings.

In an alternative combination of the probability-based solution and preference-based solution, the system may be designed to simply use the preference-based solution or a combination of the preference and probability-based solutions when preferences are indicated by a user, but to simply use the probability-based solution where no preferences are indicated. This allows preference-based information to still be utilized even when a large number of the users elect not to specify preferences, or where a user wishes to provide preferences for certain contexts but not others.

Figure 10:
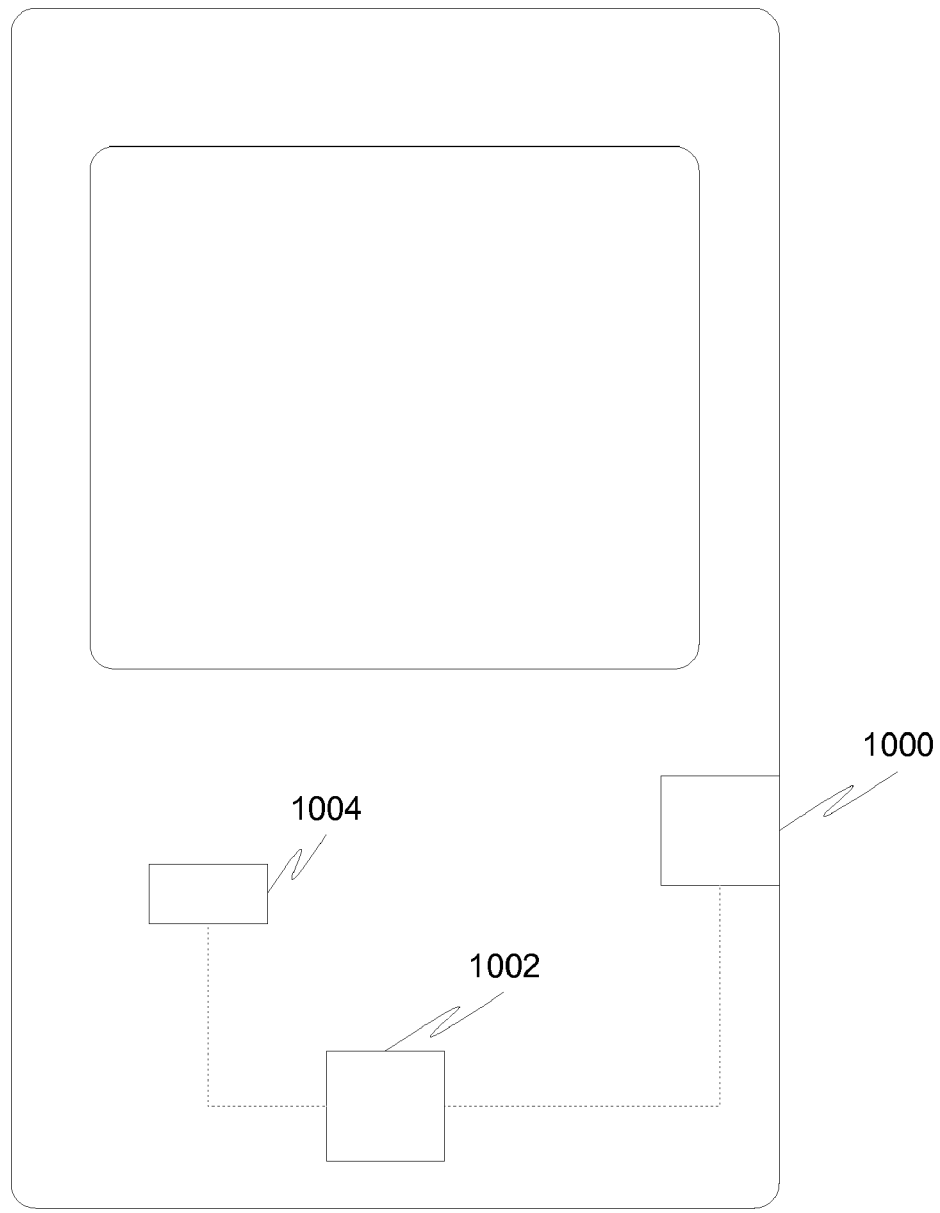
FIG. 10 is a block diagram illustrating a system in accordance with an embodiment of the present invention.

FIG. 10 is a block diagram illustrating a system in accordance with an embodiment of the present invention. In this diagram the system is a mobile device. One of ordinary skill in the art will recognize, however, that the system may be embodied in many different devices or in groups of devices. For example, the system may comprise a mobile device having a processor that performs some of the recited steps and also comprise a server that performs other of the recited steps. In another example, the system may comprise a desktop computer.

The system may include an interface 1000 and one or more processors 1002. The processors may be configured to perform some or all of the steps recited in FIGS. 4-6, and 8-9 and the corresponding text above. Additionally, when the system includes a mobile device, it may include a load detection module 1004. The load detection module may detect the load level of processor 1002 (i.e., how busy the processor is). In such a case, the one or more processors may then be configured to perform the storing, and clustering, and determining when the device is not being used or is lightly used and to perform the selecting, computing, and recommending when the actual recommendation is requested by a user.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for obtaining situation-aware recommendations in a computer system, the method comprising:
receiving a definition of a set of activities to be considered, wherein the activities represent possible activities performed using the computer system;
receiving a definition of a set of context variables to be considered, wherein the context variables represent categories of possible situations in which the computer system operates when any of the activities in the set of activities is performed using the computer system;
for each context variable to be considered, receiving a definition of a set of states to be considered, wherein the states represent possible specific situations in which the computer system operates;
for each context variable to be considered, receiving a specification of first probability distributions for each corresponding state;
for each combination of context variable to be considered and each activity to be considered, receiving a specification of second probability distributions to represent the likelihood of the activity being performed in the corresponding context;
generating usage data using the first and second probability distributions; and
applying a situation-aware recommendation process using the generated usage data using a microprocessor.

2. The method of claim 1, wherein the definition of a set of context variables to be considered and the definition of a set of activities to be considered include probabilistic descriptions.

3. The method of claim 1, wherein the specification of second probability distributions is generated by generating a specified number of application usage vectors according to the Bernoulli distribution for each application usage.

4. The method of claim 3, wherein the generating a specified number of application usage vectors includes multiplying each application usage vector by a probabilities of the application's usage, generating a number of binary values of 1's equal to this multiplied product, and distributing the number of binary values of 1 along with a number of binary values of 0 among the instances in the situation for a specific application usage.

5. The method of claim 1, wherein the specification of first probability distributions is generated by generating a histogram over context values for each context variable so that a number of items in the histogram becomes a specified number of instances, and randomly distributing the context values according to the histogram among the instances in the situation for a specific context variable.

6. The method of claim 1, further comprising removing any context vectors having conflicting values.

7. A method for obtaining situation-aware recommendations in a computer system, the method comprising:
generating initial training data, wherein the initial training data includes randomly distributed generated context values generated according to a histogram of context variables to generated context variables, wherein the context variables represent categories of possible situations in which the computer system operates when an activity is performed using the computer system;
running a situation-aware recommendation process, using a microprocessor, a first time using the initial training data as input data, wherein the situation-aware recommendation process recommends one or more items to a user based on a situation in which the computer system is operating; and
replacing one or more items of initial training data with trace usage data from a device;
running the situation-aware recommendation process, using the microprocessor, a second time using the trace usage data.

8. The method of claim 7, wherein the running the situation-aware recommendation process a second time includes running the situation-aware recommendation process a second time using the trace usage data and one or more non-replaced items of initial training data.

9. The method of claim 7, wherein the replacing includes replacing all of the initial training data with trace usage data once the amount of trace usage data exceeds a predefined threshold.

10. The method of claim 7, wherein the replacing includes finding a closest situation in the generated usage data to the trace usage data;
replacing the generated usage data corresponding to the closest situation with the trace usage data.

11. An apparatus comprising:
an interface; and
one or more processors configured to:
receive a definition of a set of activities to be considered, wherein the activities represent possible activities performed using the computer system;
receive a definition of a set of context variables to be considered, wherein the context variables represent categories of possible situations in which the computer system operates when any of the activities in the set of activities is performed using the computer system;
for each context variable to be considered, receive a definition of a set of states to be considered, wherein the states represent specific situations in which the computer system operates;
for each context variable to be considered, receive a specification of first probability distributions for each corresponding state;
for each combination of context variable to be considered and each activity to be considered, receive a specification of second probability distributions to represent the likelihood of the activity being performed in the corresponding context;
generate usage data using the first and second probability distributions; and
apply a situation-aware recommendation process using the generated usage data.

12. An apparatus comprising:
an interface; and
one or more processors configured to:
generate initial training data wherein the initial training data includes randomly distributed generated context values generated according to a histogram of context variables to generated context variables, wherein the context variables represent categories of possible situations in which the computer system operates when an activity is performed using the computer system;
run a situation-aware recommendation process a first time using the initial training data as input data, wherein the situation-aware recommendation process recommends one or more items to a user based on a situation in which the computer system is operating;
replace one or more items of initial training data with trace usage data from a device; and
run the situation-aware recommendation process a second time using the trace usage data.

13. A system for obtaining situation-aware recommendations in a computer system, the system comprising:
means for receiving a definition of a set of activities to be considered, wherein the activities represent possible activities performed using the computer system;
means for receiving a definition of a set of context variables to be considered, wherein the context variables represent categories of possible situations in which the computer system operates when any of the activities in the set of activities is performed using the computer system;
means for, for each context variable to be considered, receiving a definition of a set of states to be considered, wherein the states represent possible specific situations in which the computer system operates;
means for, for each context variable to be considered, receiving a specification of first probability distributions for each corresponding state;
means for, for each combination of context variable to be considered and each activity to be considered, receiving a specification of second probability distributions to represent the likelihood of the activity being performed in the corresponding context;
means for generating usage data using the first and second probability distributions; and
means for applying a situation-aware recommendation process using the generated usage data using a microprocessor.

14. A system for obtaining situation-aware recommendations in a computer system, the system comprising:
means for generating initial training data, wherein the initial training data includes randomly distributed generated context values generated according to a histogram of context variables to generated context variables, wherein the context variables represent categories of possible situations in which the computer system operates when an activity is performed using the computer system;
means for running a situation-aware recommendation process a first time using the initial training data as input data, wherein the situation-aware recommendation process recommends one or more items to a user based on a situation in which the computer system is operating;
means for replacing one or more items of initial training data with trace usage data from a device; and
means for running the situation-aware recommendation process a second time using the trace usage data.

15. A non-transitory computer readable medium containing computer instructions stored therein for causing a computer processor to perform a method for obtaining situation-aware recommendations in a computer system, the method comprising:
receiving a definition of a set of activities to be considered, wherein the activities represent possible activities performed using the computer system;
receiving a definition of a set of context variables to be considered, wherein the context variables represent categories of possible situations in which the computer system operates when any of the activities in the set of activities is performed using the computer system;
for each context variable to be considered, receiving a definition of a set of states to be considered, wherein the states represent possible specific situations in which the computer system operates;
for each context variable to be considered, receiving a specification of first probability distributions for each corresponding state;
for each combination of context variable to be considered and each activity to be considered, receiving a specification of second probability distributions to represent the likelihood of the activity being performed in the corresponding context;
generating usage data using the first and second probability distributions; and
applying a situation-aware recommendation process using the generated usage data using a microprocessor.

16. A non-transitory computer readable medium containing computer instructions stored therein for causing a computer processor to perform a method for obtaining situation-aware recommendations in a computer system, the method comprising:
generating initial training data, wherein the initial training data includes randomly distributed generated context values generated according to a histogram of context variables to generated context variables, wherein the context variables represent categories of possible situations in which the computer system operates when an activity is performed using the computer system;

running a situation-aware recommendation process a first time using the initial training data as input data, wherein the situation-aware recommendation process recommends one or more items to a user based on a situation in which the computer system is operating;

replacing one or more items of initial training data with trace usage data from a device; and running the situation-aware recommendation process a second time using the trace usage data.

* * * * *